(12) United States Patent
Vasic et al.

(10) Patent No.: US 11,396,131 B2
(45) Date of Patent: Jul. 26, 2022

(54) SCREEN UNIT FOR A PRINTING DEVICE AND A PRINTING SYSTEM

(71) Applicants: Exentis Group AG, Stetten (CH); EKRA Automatisierungssysteme GmbH, Bönnigheim (DE)

(72) Inventors: Srdan Vasic, Horgen (CH); Markus Engel, Moosen/Vils (DE); Franz Plachy, Brackenheim (DE); Hubert Reinisch, Freiberg am Neckar (DE)

(73) Assignees: Exentis Group AG, Stetten (CH); EKRA Automatisierungssysteme GmbH, Bönnigheim (DE)

( * ) Notice: Subject to any disclaimer, the term of this patent is extended or adjusted under 35 U.S.C. 154(b) by 21 days.

(21) Appl. No.: 16/762,269

(22) PCT Filed: Nov. 9, 2018

(86) PCT No.: PCT/EP2018/080797
§ 371 (c)(1),
(2) Date: May 7, 2020

(87) PCT Pub. No.: WO2019/092195
PCT Pub. Date: May 16, 2019

(65) Prior Publication Data
US 2021/0170683 A1 Jun. 10, 2021

(30) Foreign Application Priority Data
Nov. 10, 2017 (EP) ..................................... 17201060

(51) Int. Cl.
*B41F 15/34* (2006.01)
*B29C 64/209* (2017.01)
(Continued)

(52) U.S. Cl.
CPC .......... *B29C 64/209* (2017.08); *B29C 64/364* (2017.08); *B41F 15/34* (2013.01); *B41F 15/44* (2013.01); *B41P 2215/00* (2013.01)

(58) Field of Classification Search
CPC combination set(s) only.
See application file for complete search history.

(56) References Cited

U.S. PATENT DOCUMENTS 2,610,577 A 9/1952 Heintges
4,173,928 A 11/1979 Mitter
(Continued)

FOREIGN PATENT DOCUMENTS

DE 26 43 226 A1 3/1978
DE 27 22 060 A1 11/1978
(Continued)

OTHER PUBLICATIONS

International Search Report and Written Opinion dated May 16, 2019 in Application No. PCT/EP2018/080797, filed Nov. 9, 2018.
(Continued)

*Primary Examiner* — Matthew G Marini
*Assistant Examiner* — Marissa Ferguson-Samreth
(74) *Attorney, Agent, or Firm* — Knobbe, Martens, Olson & Bear LLP

(57) ABSTRACT

A screen unit for a printing device for printing three-dimensionally shaped structures, in particular on substrates, printed circuit boards, wafers, solar cells, carrier substrates, printing tables, carrier plates, sintering plates or the like, has a frame holding at least one printing screen and is designed to be accommodated in a screen receptacle of the printing device, to be filled with a printing compound and to be subjected to the action of a squeegee for carrying out a printing process. The screen unit has, in or on the frame, at
(Continued)

least one holding device for the squeegee, which is in the form of an exchangeable squeegee.

11 Claims, 1 Drawing Sheet

(51) Int. Cl.
*B29C 64/364* (2017.01)
*B41F 15/44* (2006.01)

(56) References Cited

U.S. PATENT DOCUMENTS

| | | | |
|---|---|---|---|
| 4,195,567 A * | 4/1980 | Mitter | B41F 15/0845 |
| | | | 101/115 |
| 4,223,602 A | 9/1980 | Mitter | |
| 4,967,655 A | 11/1990 | Holderegger | |
| 6,152,031 A * | 11/2000 | DeCruz | B41F 15/0813 |
| | | | 101/115 |
| 6,536,859 B1 | 3/2003 | Bathe | |
| 6,579,381 B1 | 6/2003 | Moscatelli | |
| 2003/0154868 A1 | 8/2003 | McEvoy | |
| 2008/0229944 A1 | 9/2008 | Koenig et al. | |
| 2009/0177309 A1 | 7/2009 | Kozlak | |
| 2013/0038963 A1 * | 2/2013 | Nespeca | G11B 15/6835 |
| | | | 360/92.1 |
| 2014/0117067 A1 * | 5/2014 | Sato | H05K 3/1233 |
| | | | 228/33 |
| 2014/0272191 A1 | 9/2014 | Wang | |
| 2015/0328838 A1 | 11/2015 | Erb et al. | |
| 2017/0348912 A1 | 12/2017 | Hirschberg | |
| 2019/0337287 A1 * | 11/2019 | Fukakusa | B41F 15/40 |
| 2021/0178681 A1 | 6/2021 | Vasic | |
| 2021/0178750 A1 | 6/2021 | Vasic | |

FOREIGN PATENT DOCUMENTS

| | | | |
|---|---|---|---|
| DE | 42 26 502 A1 | 2/1994 | |
| DE | 199 36 572 A1 | 2/2001 | |
| DE | 103 44 022 A1 | 4/2005 | |
| DE | 10344022 * | 4/2005 | B41F 15/34 |
| DE | 20 2013 004 745 U1 | 8/2014 | |
| EP | 0 270 485 A1 | 6/1988 | |
| EP | 2 305 467 A1 | 4/2011 | |
| WO | 2016095059 * | 12/2014 | B29C 64/106 |
| WO | WO 2016/095059 | 6/2016 | |

OTHER PUBLICATIONS

European Search Report dated Dec. 21, 2020 in EP Application No. 17 201 060.5.
International Search Report & Written Opinion, dated Dec. 20, 2018, in International Application No. PCT/EP2018/080795.
International Preliminary Search Report on Patentability, dated May 12, 2020, in International Application No. PCT/EP2018/080795.
International Search Report and Written Opinion dated May 16, 2019 in Application No. PCT/EP2018/080795, filed Nov. 9, 2018.
International Preliminary Report on Patentability, dated May 12, 2020, in International Application No. PCT/EP2018/080797.
International Search Report & Written Opinion, dated Dec. 20, 2018, in International Application No. PCT/EP2018/080797.

* cited by examiner

SCREEN UNIT FOR A PRINTING DEVICE AND A PRINTING SYSTEM

PRIORITY AND CROSS REFERENCE TO RELATED APPLICATIONS

This application is the U.S. National Phase Application under 35 U.S.C. § 371 of International Application No. PCT/EP2018/080797, filed Nov. 9, 2018, designating the U.S. and published as WO 2019/092195 A1 on May 16, 2019, which claims the benefit of European Application No. EP 17201060.5, filed Nov. 10, 2017. Any and all applications for which a foreign or a domestic priority is claimed is/are identified in the Application Data Sheet filed herewith and is/are hereby incorporated by reference in their entireties under 37 C.F.R. § 1.57.

FIELD

The invention relates to a screen unit for a printing device.

BACKGROUND

Screen units and printing systems of the type mentioned above are known from the prior art. In order to carry out a printing operation using a screen printing device, a printing compound is applied to a printing screen, which has a screen mask corresponding to the structure to be printed, which printing compound is pressed by means of a squeegee from the printing head through the screen onto, for example, a carrier substrate. Such printing systems are used, for example, in the production of electrical conductor paths on printed circuit board substrates or the like. In principle, such printing devices can work with different materials and are not limited to one printing screen and/or one material. However, if several printing processes are to be carried out in succession with different materials, this leads to the problem that both the printing device and the printing screen have to be laboriously cleaned in order to prevent the materials from mixing during the subsequent printing process.

SUMMARY

The invention relates to a screen unit for a printing device—in particular, a 3-D screen printing device—for printing three-dimensionally-shaped structures—in particular, on substrates—in particular, printed circuit boards, wafers, solar cells, carrier substrates, printing tables, carrier plates, sintering plates or the like—wherein the screen unit has a frame holding at least one printing screen and is designed to be accommodated in a screen receptacle of the printing device, to be filled with a printing compound, and to be subjected to the action of a squeegee for carrying out a printing process.

Furthermore, the invention relates to a printing system with at least one printing device for printing three-dimensionally-shaped structures—in particular, on substrates—in particular, printed circuit boards, wafers, solar cells, carrier substrates, printing tables, carrier plates, sintering plates or the like—wherein the printing device has a printing head operating with a squeegee and a screen receptacle, associated with the printing head, for receiving at least one screen unit.

BRIEF DESCRIPTION OF THE DRAWINGS

In the following, the invention shall be explained in more detail using the drawing. Shown for this purpose are FIGS. 1, 2A, and 2B.

DETAILED DESCRIPTION

Figure 1:
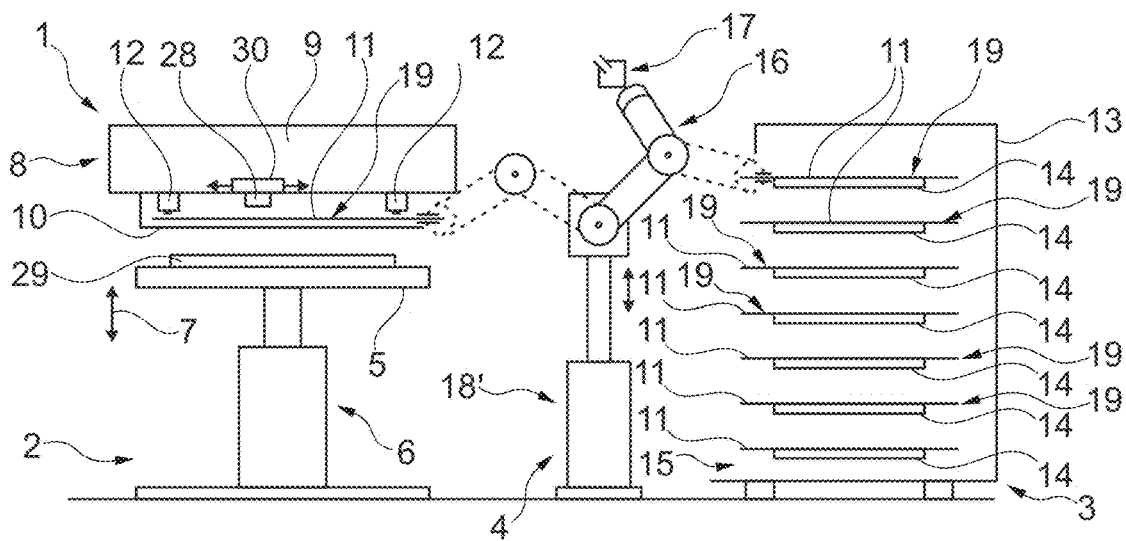
FIG. 1 shows an advantageous printing system in a simplified side view.

The invention is based upon the aim of creating a screen unit that makes it possible to avoid time-consuming cleaning and thus to promptly convert the printing device for printing with a different material.

The aim underlying the invention is achieved by a screen unit with the features of claim 1. This has the advantage that the screen unit makes a change of material in a printing device particularly easy, because the screen unit is not only exchangeable, but also carries along the elements of the printing device that are essential for the printing process and which also come into contact with the material, such that not only the printing screen, but also the tool for carrying out the printing process, can be fed to the printing device with the screen unit. According to the invention, at least one holding device for a squeegee, which is in the form of an exchangeable squeegee, is, for this purpose, arranged in or on the frame of the screen unit. Thus, the invention provides that the squeegee be able to be or be carried along on the screen unit for the printing process. The holding device holds the squeegee securely on the screen unit and allows it to be carried along with the screen unit, such that the unit consisting of the printing screen and the squeegee can always be handled together. A prerequisite for this is that the squeegee be designed as an exchangeable squeegee and therefore able to be easily replaced on the printing head or the squeegee device of the printing head. Preferably, the squeegee forms a component of the screen unit.

Furthermore, it is preferably provided that the holding device have a squeegee receptacle in which the squeegee can be accommodated. The squeegee receptacle allows the squeegee to be securely carried along and, in particular, to be aligned on the printing screen, ensuring that the squeegee can be easily gripped by the printing device.

Furthermore, it is preferably provided that the squeegee have a holding section and a squeegee section, wherein the holding device is designed to hold the squeegee only at the holding section. This means that the mechanism by which the squeegee is held to the frame is detached from the squeegee section itself, such that contamination of the mechanism by the printing compound is reliably prevented.

Furthermore, it is preferably provided that the holding device have a recess in which the squeegee section can be accommodated—in particular, without contact. Due to the—in particular—contact-free accommodation of the squeegee section, it can be accommodated on the printing screen without creating a load and be carried along with it. In addition, this prevents any printing compound remaining on the squeegee from coming into contact with the frame of the screen unit and/or the holding device and soiling it permanently and impairing the function of the holding device in particular. Furthermore, it is preferably provided that the recess in the frame be designed as a depression or a perforation. This ensures a particularly cost-effective provision of the recess and that the squeegee is easily held on the frame.

Alternatively or additionally, the holding device has at least one permanent magnet, which is arranged in or on the frame and is designed to interact magnetically with the squeegee—in particular, with the holding section of the squeegee. Thereby, the locking of the squeegee is thus ensured by means of magnetic force on the frame. This has the advantage that no material weakening and/or deformation of the frame is required in order to support the squeegee on the frame. Given that the permanent magnetic holding device is not necessarily visible to a user, in this case, the frame preferably has one or more markers that visually indicate where the squeegee can be magnetically locked to the frame. Expediently, the markings are, for this purpose, assigned to one or more permanent magnets.

Furthermore, it is preferred that the squeegee have an exchangeable connector for the printing device. Particularly at the holding section of the squeegee, the exchangeable connector is designed or arranged so as to carry out a simple squeegee exchange at the printing device—particularly, in an automated manner.

For example, the exchangeable connector has at least one locking means for locking the squeegee to the printing head of the printing device. The exchangeable connector can, for example, be designed as a bayonet lock, a screw lock, a plug lock, or a snap-in lock.

The printing system according to the invention with the features of claim 9 is characterized by the screen unit according to the invention, wherein the printing head has an exchangeable connector for the squeegee of the screen unit. This ensures that the printing device can pick up the squeegee carried along with the printing screen and use it for the printing process. Particularly when the position of the holding device on the screen unit is known, it is easily possible for the printing device to automatically approach the position of the squeegee and release it from the holding device, in order to carry out a printing process. In particular, the exchangeable connector of the printing head is designed to work in conjunction with the exchangeable connector of the squeegee, as described above.

Furthermore, it is preferable that the printing head have a device for removing and placing the squeegee from or into the holding device and for carrying out a printing process. For this purpose, the device has, for example, one or more grippers that pneumatically, magnetically, hydraulically, or electromotively grip and move the squeegee at the holding section or the exchangeable connector.

Preferably, the printing system has a plurality of screen units according to the invention. In particular, a separate screen unit is present for the respective print pattern or print structure and the material to be used for this purpose, in order to enable rapid screen replacement and thus rapid operation of the printing device for carrying out a multi-layer, three-dimensional printing process.

Furthermore, it is preferably provided that the printing system have a screen magazine, which has several screen stores for receiving one screen unit each, and that the screen units be stored or able to be stored in the screen magazine. The screen magazine helps to keep the printing screens in order and, in particular, to sort them according to material and/or printing structure, for example.

Furthermore, it is preferably provided that the screen magazine have a conditioning device for setting or maintaining a climate in the screen magazine, by which the drying out of printing compound remaining on a screen unit is prevented. The conditioning device ensures that printing screens that have been in the screen magazine for a longer period of time and still contain residues of printing compound can be reused without first having to be cleaned and completely refilled with printing compound. This both reduces material consumption and shortens the processing time.

Furthermore, it is preferably provided that the printing system have a transport device that is designed to remove a selected screen unit from the screen magazine and to arrange it in the screen receptacle of the printing device, and vice versa. This ensures automatic screen exchange, which further accelerates and simplifies the printing of three-dimensional structures—in particular, with different materials.

FIG. 1 shows a simplified side view of a printing system 1, which has a printing device 2, a screen magazine 3, and a transport device 4.

The printing device 2 has a printing table 5, which is adjustable in height by a lifting device 6, as indicated by a double arrow 7. The printing table 5 is assigned a printing head 8, which has a squeegee device 9. In addition to a squeegee, which is not shown in detail here, the squeegee device 9 has a screen receptacle 10 in which a printing screen 11 can be accommodated. The screen receptacle 10 is designed as a plug-in receptacle, into which the printing screen 11 can be inserted—in particular, slid in sideways or horizontally, as shown in FIG. 1. Alternatively, the screen receptacle 10 is designed so that the printing screen 11 can be placed in it. Optionally, the screen receptacle 10 has controllable clamping elements 12, by means of which the printing screen 11 can be firmly clamped in the screen receptacle 10, such that the orientation and position of the printing screen 11 does not change during a printing process in which the squeegee of the squeegee device 9 is moved over the printing screen 11.

The screen magazine 3 has a housing 13 and, in the present case, is located at a distance from the printing device 2. In the housing 13, several screen stores 14 are arranged so as to be one above the other or stacked on top of each other. The screen stores 14, for example, are designed in the same manner as the screen receptacle 10 and, optionally, also have the clamping elements 12. A printing screen 11 can be arranged in each screen store 14. The housing 13 is essentially closed, but, on a side facing, in particular, the printing device 2, has a removal opening 15 through which a printing screen 11 can be inserted into or removed from the housing 13.

The transport device 4 is designed to move the printing screens 11. According to the present exemplary embodiment, this has a multi-jointed transport arm 16, which carries a gripper 17 at its free end. For example, the gripper 17 is designed to operate pneumatically or mechanically, in order to grip a single printing screen 11. The transport device 4 is arranged between the printing device 2 and the screen magazine 3 in such a manner that the transport arm 16 can reach both a printing screen 11 assigned to the removal opening 15 and a printing screen 11 placed in the screen receptacle 10. According to the present exemplary embodiment, the removal opening 15 extends almost over the entire height of the screen magazine 3, wherein the transport arm 16 is designed in such a manner that it can reach each screen store 14 or the printing screen located therein. Optionally, the transport device 4 is equipped with its own lifting device 18', in order to increase the freedom of movement of the gripper 17. Together with the screen magazine 3, the transport device 4 forms a screen provision system for the printing device 2.

The function of the advantageous printing system 1 is as follows. For the printing of three-dimensionally-shaped structures, the transport device 4 is initially controlled so as to remove a specific printing screen 11 from the screen magazine 3 and feed it to the screen receptacle 10. The printing screen 11 is locked in the screen receptacle 10 by means of the clamping means 12. Subsequently, a printing compound—in particular, printing paste—of a selected material is applied to the printing screen 11, and a squeegee of the squeegee device 9 is pushed over the printing screen 11, such that the printing compound is pressed through the printing screen 11 onto the printing table. In the process, it is conceivable that the printing compound is applied directly to the printing table 5, or to a substrate 19, arranged on the printing table 5, which can be designed as a carrier substrate, for example, or also as a printed circuit board, a wafer or the like. For this purpose, the printing screen 11 has screen openings in areas that correspond to the desired first layer of the structure to be printed. Thereby, many such structures can be incorporated into the printing screen 11, such that several components or structural elements/structures, simultaneously to a printing process, can also be produced next to one another on the substrate 19 and/or the printing table 5.

After the first printing layer has been produced, the printing table 7 is, for example, moved downwards by the lifting device 6, and a further printing process is carried out, with which the same printing screen 11 is used to produce a further printing layer that has the same structure as the first printing layer. Optionally, one of the other printing screens 11 is used instead of the same printing screen 11. For this purpose, the transport arm 16 moves the printing screen 11 located in the screen receptacle 10 into the screen magazine 3, viz., into a there free screen store 14. Subsequently, the transport arm 16 takes another screen 11 from another print store 14 and feeds it to the screen receptacle 10 of the printing device 2. In a subsequent printing process, a print layer that, for example, differs in shape from the previous print layer is then produced. This principle makes it possible to produce several printing layers on top of each other which are different from each other, making it possible to also produce complex, three-dimensional structures. After each printing operation, the print table 5 is lowered a little, or, alternatively, the printing head 9 is raised a little.

Each printing screen 11 is framed by a screen frame 18, which ensures that the printing screen 11 is tensioned and transportable.

Figure 2A:
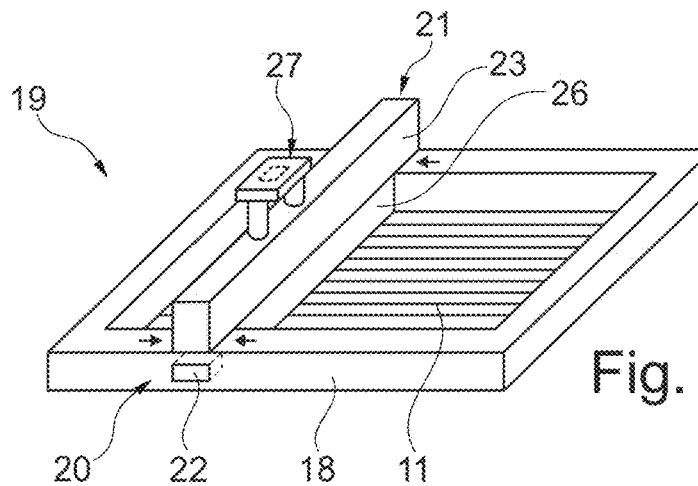
FIGS. 2A and 2B show exemplary embodiments of an advantageous screen unit for the printing system, in simplified perspectival illustrations.

FIG. 2A shows in this regard a simplified perspectival view of a screen unit 19 of the printing system, which has the rectangular screen frame 18, the printing screen 11 held by the screen frame 18, and a squeegee 21 for the squeegee device 9 of the printing device 2. A holding device 20 for holding the squeegee 21 is also arranged on the screen frame 18. For example, as shown in FIG. 2A, the holding device 20 has a permanent magnet 22 on each side of the frame 18, which magnetically interacts with a holding section 23 of the squeegee 21, in order to attach or lock the squeegee 21 to the screen frame 18 by magnetic force. For this purpose, the holding section 23 of the squeegee 21 is, expediently, made of a material that interacts magnetically with the permanent magnet 22. Thereby, the holding section 23 extends laterally beyond the printing screen 11, such that the holding section 23 rests on the screen frame 18 and can be magnetically held there, as shown in FIG. 2A.

Figure 2B:
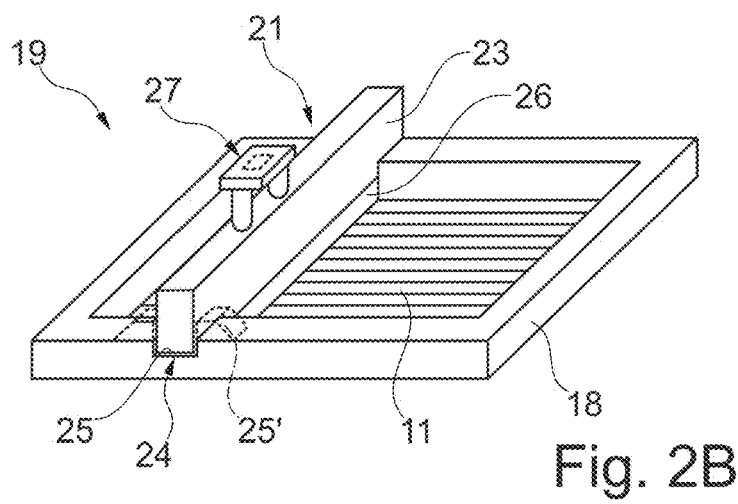

FIG. 2B shows an additional exemplary embodiment of the screen unit 19, which differs from the previous exemplary embodiment in that the holding device 20 is not, or not only, provided by magnetic force, but also offers a positive-locking holding of the squeegee 21. For this purpose, according to the exemplary embodiment in FIG. 2B, screen frame 18 has a squeegee receptacle 24, in which the holding section 23 of squeegee 21 can be accommodated. The squeegee receptacle 24 can be directly provided by a recess 25 or a depression in the screen frame 18, or by two elevations 25', arranged at a distance from one another, on the top, facing the squeegee 21, of the screen frame 18, as shown in FIG. 2B by dashed lines as a further option.

In each case, in addition to the holding section 23, the squeegee 21 has a squeegee section 26, with which the printing screen 11 is coated or acted upon during a printing process in order to press the printing paste through the printing screen 11 onto the substrate 29.

In addition, the squeegee 21 has an exchangeable connector 27, which works together with an exchangeable connector 28 of the printing device 2 or the squeegee device 9 in order to attach the squeegee 21 to the squeegee device 9 in a releasable manner. Thereby, the squeegee device 9 has a device 30, with the exchangeable connector 28, for gripping and moving the squeegee 21, as shown in FIG. 1. The exchangeable connector 27 is, for example, a bayonet lock, a snap-in lock or the like, which permits a releasable connection. Since the position of the holding device 20 is, in principle, known, and, in particular, is the same at each screen frame 18 of the existing screen units 19 of the printing system 1, the printing device 2 can easily be programmed in such a way that, at the beginning of a printing process, the squeegee device 9 first approaches the position of the squeegee 21 with the exchangeable connector 28, grips the squeegee 21 by connecting the exchangeable connectors 27, 28 to each other, and then carries out the printing process. When the printing process is finished, the squeegee device 9 accordingly places the squeegee 21 at the known position of the holding device 20 and the screen unit 19, i.e., the printing screen 11, together with the squeegee 21, can be removed from the printing device 2 and, for example, returned to the screen magazine 3.

The presence of several screen units 19, which, in particular, have different printing screens 11, and are pre-filled or can be filled with different materials, ensures the rapid printing of three-dimensionally-shaped structures at low cost and in a manner that saves resources. For this purpose, each of the printing screens 11 of the printing system 1 is, expediently, designed as a screen unit 19, as described above, such that the screen units 19, each of which has its own squeegee, are transported by the transport device 4 or automatically fed to the printing device 2 and stored in the screen magazine 3, as described with reference to the printing screens 11, together with the respectively associated squeegee 21.

What is claimed is:

1. Screen unit for a printing device for printing three-dimensionally-shaped structures wherein the screen unit comprises a frame holding at least one printing screen and is designed to be accommodated in a screen receptacle of the printing device, to be filled with a printing compound, and to be subjected to an action of a squeegee for carrying out a printing process,
    wherein the screen unit comprises the squeegee and in or on the frame at least one holding device for the squeegee, which is in the form of an exchangeable squeegee,
    wherein the squeegee has a holding section and a squeegee section, wherein the holding device is designed to hold the squeegee only at the holding section, and
    wherein the holding device has a recess in which the squeegee section can be arranged without contact.

2. Screen unit according to claim 1, wherein the holding device has a squeegee receptacle in which the squeegee can be arranged.

3. Screen unit according to claim 1, wherein the recess in the frame is designed as a depression or as a perforation.

4. Screen unit according to claim 1, wherein the squeegee has an exchangeable connector for the printing device.

5. Screen unit according to claim 1, wherein the exchangeable connector has at least one locking means for locking the squeegee to a printing head of the printing device.

6. Printing system with at least one printing device for printing three-dimensionally-shaped structures wherein the printing device has a printing head, with a squeegee device to which a squeegee can be assigned, and which has a screen receptacle for receiving at least one screen unit, wherein the screen unit is designed according to claim 1, and has a squeegee with an exchangeable connector for the squeegee device.

7. Printing system according to claim 6, wherein that the squeegee device has a device for removing and placing the squeegee from or into the holding device and for carrying out a printing operation.

8. Printing system according to claim 6, wherein that a plurality of screen units are present.

9. Printing system according to claim 6, wherein that a screen magazine is present, which has several screen stores for receiving one screen unit each, and that the screen units are stored in the screen magazine.

10. Printing system according to claim 6, wherein that the screen magazine has a conditioning device for setting or maintaining a climate in the screen magazine, by which the drying out of printing compound remaining on a screen unit is prevented.

11. Printing system according to claim 6, wherein that a transport device is present, which is designed to remove a selected screen unit from the screen magazine and to arrange it in the screen receptacle of the printing device, and vice versa.

* * * * *